(12) United States Patent
Mayer et al.

(10) Patent No.: US 8,375,250 B2
(45) Date of Patent: Feb. 12, 2013

(54) SYSTEM AND METHOD FOR TESTING A MODULE

(75) Inventors: Albrecht Mayer, Deisenhofen (DE); Wolfram Carl, Munich (DE)

(73) Assignee: Infineon Technologies AG, Neubiberg (DE)

( * ) Notice: Subject to any disclaimer, the term of this patent is extended or adjusted under 35 U.S.C. 154(b) by 439 days.

(21) Appl. No.: 12/398,012

(22) Filed: Mar. 4, 2009

(65) Prior Publication Data
US 2010/0229038 A1 Sep. 9, 2010

(51) Int. Cl.
*G06F 11/00* (2006.01)

(52) U.S. Cl. ........... 714/25; 714/10; 714/19; 710/14; 710/16; 710/200

(58) Field of Classification Search ............ 714/10, 714/19; 712/229; 701/1; 713/300; 710/14, 710/16, 200
See application file for complete search history.

(56) References Cited

U.S. PATENT DOCUMENTS

| | | | |
|---|---|---|---|
| 5,428,624 A * | 6/1995 | Blair et al. ............ | 714/727 |
| 5,978,937 A * | 11/1999 | Miyamori et al. ........ | 714/45 |
| 6,615,366 B1 * | 9/2003 | Grochowski et al. ........ | 714/10 |
| 6,708,270 B1 * | 3/2004 | Mayer ............ | 713/1 |
| 2002/0070851 A1 * | 6/2002 | Raichle et al. ........ | 340/438 |
| 2002/0073357 A1 * | 6/2002 | Dhong et al. ......... | 714/19 |
| 2002/0144201 A1 * | 10/2002 | Mayer et al. ......... | 714/726 |
| 2002/0194549 A1 * | 12/2002 | Kolof et al. ........ | 714/43 |
| 2003/0014695 A1 * | 1/2003 | Mayer ............ | 714/39 |
| 2003/0046666 A1 * | 3/2003 | Siebert et al. ........ | 717/127 |
| 2003/0110012 A1 * | 6/2003 | Orenstien et al. ........ | 702/188 |
| 2003/0216889 A1 * | 11/2003 | Marko et al. ........ | 702/182 |
| 2004/0019771 A1 * | 1/2004 | Quach ............ | 712/229 |
| 2004/0111188 A1 * | 6/2004 | McClure et al. ........ | 701/1 |
| 2005/0235306 A1 * | 10/2005 | Fima ............ | 725/10 |
| 2006/0230262 A1 | 10/2006 | Jansen et al. | |
| 2006/0242501 A1 * | 10/2006 | Kimelman et al. ........ | 714/724 |
| 2006/0288243 A1 * | 12/2006 | Kim ............ | 713/300 |
| 2007/0061650 A1 * | 3/2007 | Mayer ............ | 714/731 |
| 2007/0180318 A1 * | 8/2007 | Morozumi ........ | 714/23 |
| 2007/0255875 A1 * | 11/2007 | Weiberle et al. ........ | 710/116 |
| 2007/0277023 A1 * | 11/2007 | Weiberle et al. ........ | 712/229 |
| 2008/0040636 A1 * | 2/2008 | Mayer et al. ........ | 714/724 |
| 2008/0042875 A1 * | 2/2008 | Harrington et al. ........ | 340/870.19 |
| 2008/0270660 A1 * | 10/2008 | Weiberle et al. ........ | 710/261 |
| 2009/0105903 A1 * | 4/2009 | Iwai ............ | 701/35 |

OTHER PUBLICATIONS

Hannover, "Controller Area Network (CAN)", Oct. 2007, p. 1-12.*
Bosch, "CAN Specification", 1991, Bosch, ver. 2.0, p. 1-72.*
Microchip, "A CAN physical Layer Discussion", 2002, Microchip Technology, p. 1-12.*
Texas Instrument, "High Speed CAN transceivers" Apr. 2000, Texas Instruments, p. 1-17.*

(Continued)

*Primary Examiner* — Scott Baderman
*Assistant Examiner* — Jeison C Arcos
(74) *Attorney, Agent, or Firm* — Slater & Matsil, L.L.P.

(57) ABSTRACT

In an embodiment, a system has a bus interface port, a selection circuit coupled to the bus interface port, a first bus interface circuit coupled to the selection circuit and a second bus interface circuit coupled to the selection circuit. The selection circuit is configured to select between the first bus interface circuit and the second bus interface circuit. The system also has an initialization circuit configured to detect a first codeword written to the bus interface port, and activate the second bus interface circuit if the first codeword is detected.

22 Claims, 6 Drawing Sheets

OTHER PUBLICATIONS

Intel, "Low Pin Count" Aug. 2002, Intel, rev. 1.1, p. 1-54.*
Johansson, "Vehicle Applications of Controller Area Netowrk", 2005, Universitat Trier, p. 1-27.*
ARM, "Cortex-M1 Technical Reference Manual", Sep. 28, 2007, ARM, rev. r0p1, p. 1-234.*

Product Brief, "TC1797 High Performance 32-bit TriCore-based Microcontroller for Automotive Applications", 2007, 2 pages, Infineon Technologies AG, Munich, Germany.

* cited by examiner

SYSTEM AND METHOD FOR TESTING A MODULE

TECHNICAL FIELD

This invention relates generally to semiconductor circuits, and more particularly to a system and method for testing a module.

BACKGROUND

On board electronic control units (ECU) can control all aspects of an automobile's operation such as the fuel system, ignition system, traction control system and air conditioning and heating systems. A typical automobile may contain dozens of ECUs. Because safety and reliability standards for automotive electronics have become increasingly more stringent, the ability to quickly test newly manufactured electronic units and debug failing units has become increasingly more important.

Automotive ECU modules commonly consist of a microcontroller or microprocessor and other circuits such as memory and interface circuitry mounted on a printed circuit board (PCB) and interfaced with a single connector that provides power and signal interfaces. If a component within the ECU module fails, pinpointing the cause of the failure generally involves physically opening the module and analyzing the failure by probing the PCB, supplying test signals, and de-soldering individual components on which to perform a failure analysis.

One complicating factor in performing test and debug on an ECU module is that the testing functions on individual components are often only accessible via dedicated pins that are tied to supply and ground during normal operation. Because test interfaces are unavailable at the module level, the possibility of quickly performing a comprehensive debug and/or failure analysis in the field is very limited.

In the field of automotive electronics, what are needed are systems and methods of quickly testing and performing failure analysis on modules without disassembling the module.

SUMMARY OF THE INVENTION

In an embodiment, a system is disclosed. The system has a bus interface port, a selection circuit coupled to the bus interface port, a first bus interface circuit coupled to the selection circuit and a second bus interface circuit coupled to the selection circuit. The selection circuit is configured to select between the first bus interface circuit and the second bus interface circuit. The system also has an initialization circuit configured to detect a first codeword written to the bus interface port, and activate the second bus interface circuit if the first codeword is detected. The foregoing has outlined, rather broadly, features of the present invention.

Additional features of the invention will be described, hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of embodiments of the present invention and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

The present invention will be described with respect to embodiments in a specific context, namely a system and method for testing an automotive electronic control unit. Embodiments of this invention may also be applied to other circuits and systems that require non-invasive testing or access of functions not ordinarily accessible on the interface port.

Figure 1:
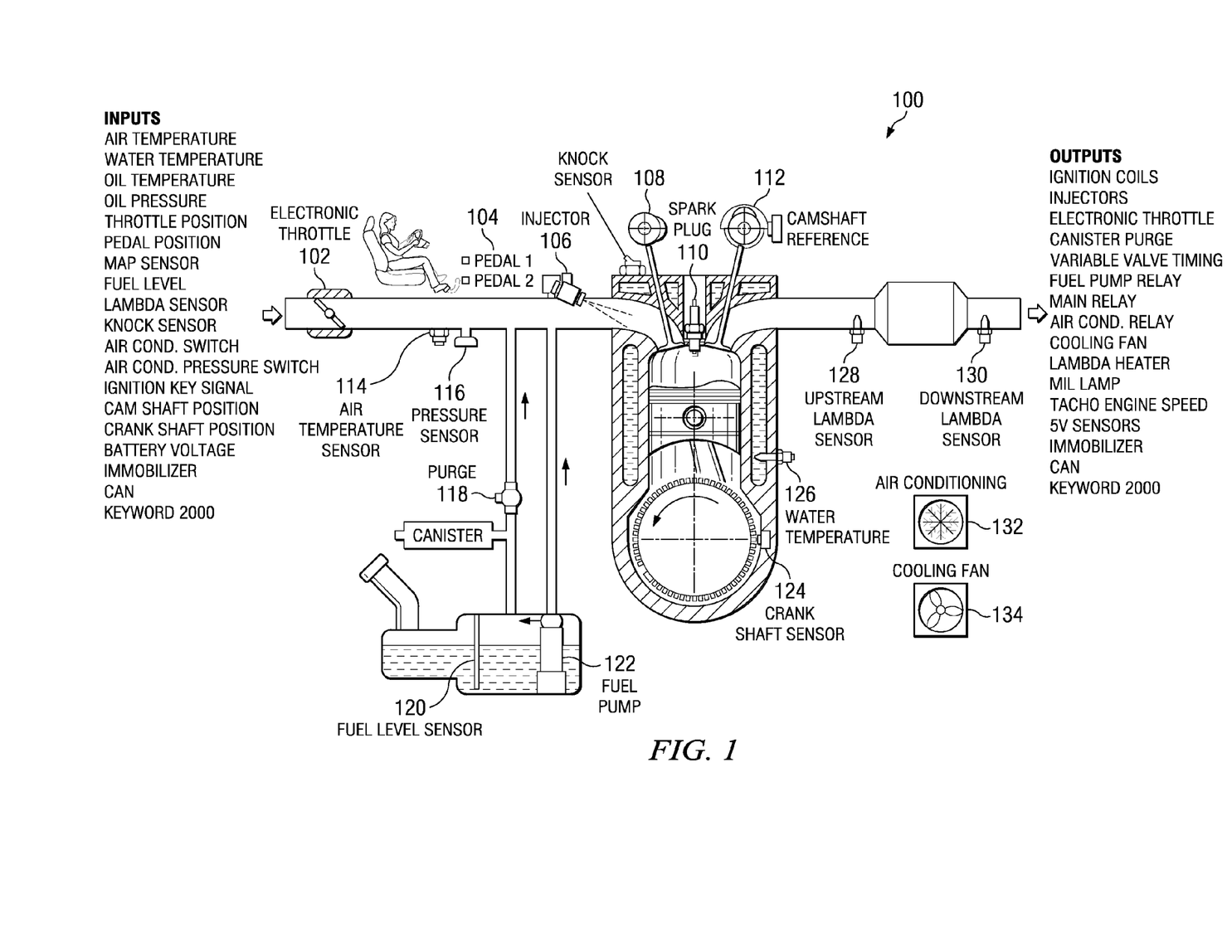
FIG. 1 illustrates an automotive system diagram and interface list for an embodiment automotive electronic control unit.

FIG. 1 illustrates an embodiment automotive system 100 showing control and sensor lines that are typically interfaced to an electronic control system. Sensor signals emanate, for example, from foot pedals 104, knock sensor 108, camshaft position reference 112, air temperature sensor 114, pressure sensor 116, fuel level sensor 120, crankshaft sensor 124, water temperature sensor 126, upstream lambda sensor 128, and downstream sensor 130. Control signals, on the other hand, control the electronic throttle 102, injector 106, a spark plug 110, fuel pump 122, canister purge 118, air conditioning 132 and cooling fan 134. The described and illustrated control and sensor lines serve as examples. Some embodiment automotive systems according to the present invention may have more or fewer sensor and control signals than is shown in FIG. 1.

Figure 2:
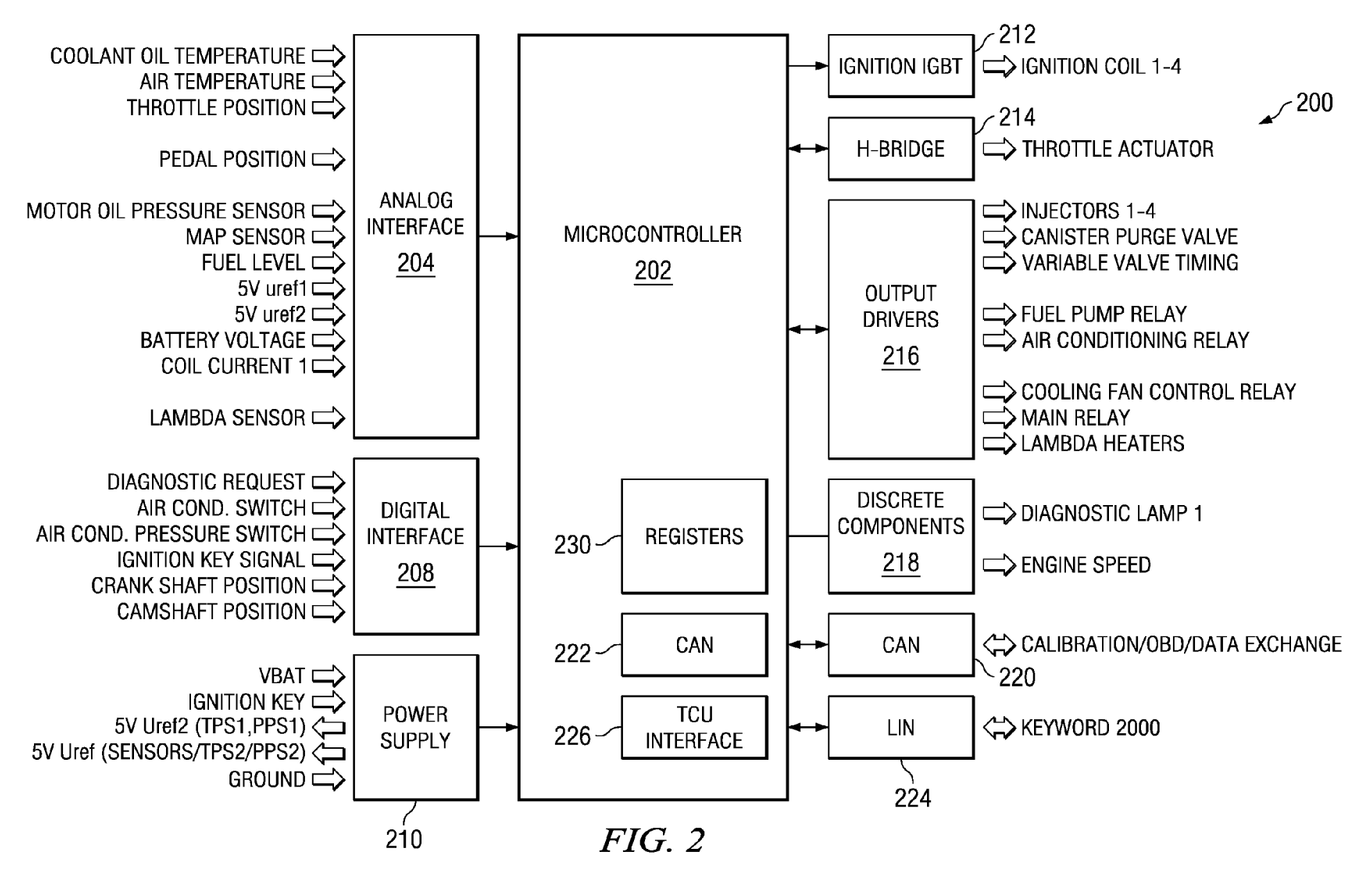
FIG. 2 illustrates a block diagram embodiment electronic control unit.

FIG. 2 illustrates a block diagram of an embodiment automotive electronic control system (ECS) 200. ECS 200 has microcontroller 202 coupled to analog interface 204, digital interface 208, power supply 210, ignition IGBT 212, H-Bridge 214, output drivers 216, discrete components 218, Controller Area Network (CAN) interface block 220 and Local Interconnect Interface block 224. In embodiments of the present invention, these blocks reside on a printed circuit board PCB within a physical module.

Microcontroller 202 receives data from interfaces 204 and 208 and provides control signals to interfaces 212, 214, 216 and 218 based on a program stored either in external memory or in an internal memory (not shown). Direct programming and control of microcontroller 202 occurs via either though CAN interface 220 and 222, LIN interface 224, or on-chip or onboard non-volatile memory (not shown). In conventional embodiments, however, test functionality is not achieved through the CAN interface, but is activated using an external test mode pin (not shown) to enable the TCU, and an external JTAG/DAP debug interface (not shown) to operate and communicate with the TCU. In embodiments of the present invention, test control unit (TCU) 226 provides test functionality via CAN interface hardware 220. Microcontroller 202 also contains registers 230. In alternative embodiments of the present invention, other control circuits besides a microcontroller based control circuit can be used, for example, a microprocessor, or other dedicated control logic.

Analog interface 204 interfaces analog signals such as oil temperature, air temperature, throttle position, pedal position, oil pressure, MAP sensor, fuel level, battery voltage, generated voltages, coil current and lambda sensor to microcontroller 202. Analog interface 204, according to embodiments of the present invention, are designed according to conventional techniques known in the art and generally have one or more analog to digital converters on one or more analog multiplexers.

Digital interface 208 interfaces switch and discrete signals to microcontroller 202, such as a diagnostic request signal, air conditioning switch, air conditioning pressure switch, ignition key signal, and crankshaft and camshaft position signals. Digital interface 208 is implemented according to conventional embodiments known in the art.

Electronic control unit 200 also provides and receives power supply voltages to and from the automobile in embodiments of the present invention via power supply interface 210. Power supply interface 210 is also implemented according to conventional techniques.

Ignition coils are activated via ignition IGBT 212, and the throttle actuator is controlled via H-bridge 214 under the control of microcontroller 202. Output drivers 216 provide control signals to fuel injectors, the canister purge valve, variable valve timing, fuel pump relay, air conditioning relay. Discrete components 218 drive diagnostic lamps and control engine speed. In alternative embodiments of the present invention, some of the illustrated sensor and control signals may be omitted, while other sensor and control signals not shown herein may be included. It should be further appreciated that other interface blocks besides the described and illustrated blocks may be used depending on the technology and the specifications of the target automotive system.

CAN controller 222 and CAN interface 220 provide a communication link to ECU 200 according to the ISO 11898 CAN interface standard, which is an arbitration free interface standard used to communicate with automotive ECUs. In alternative embodiments of the present invention, other interface standards can be used depending on the system specifications and technology used. For example, in further automotive systems a LIN or FlexRay interface can be used. In non-automotive systems such as mobile phones, an interface such as USB, memory card or smartcard can be used, for example.

Figure 3:
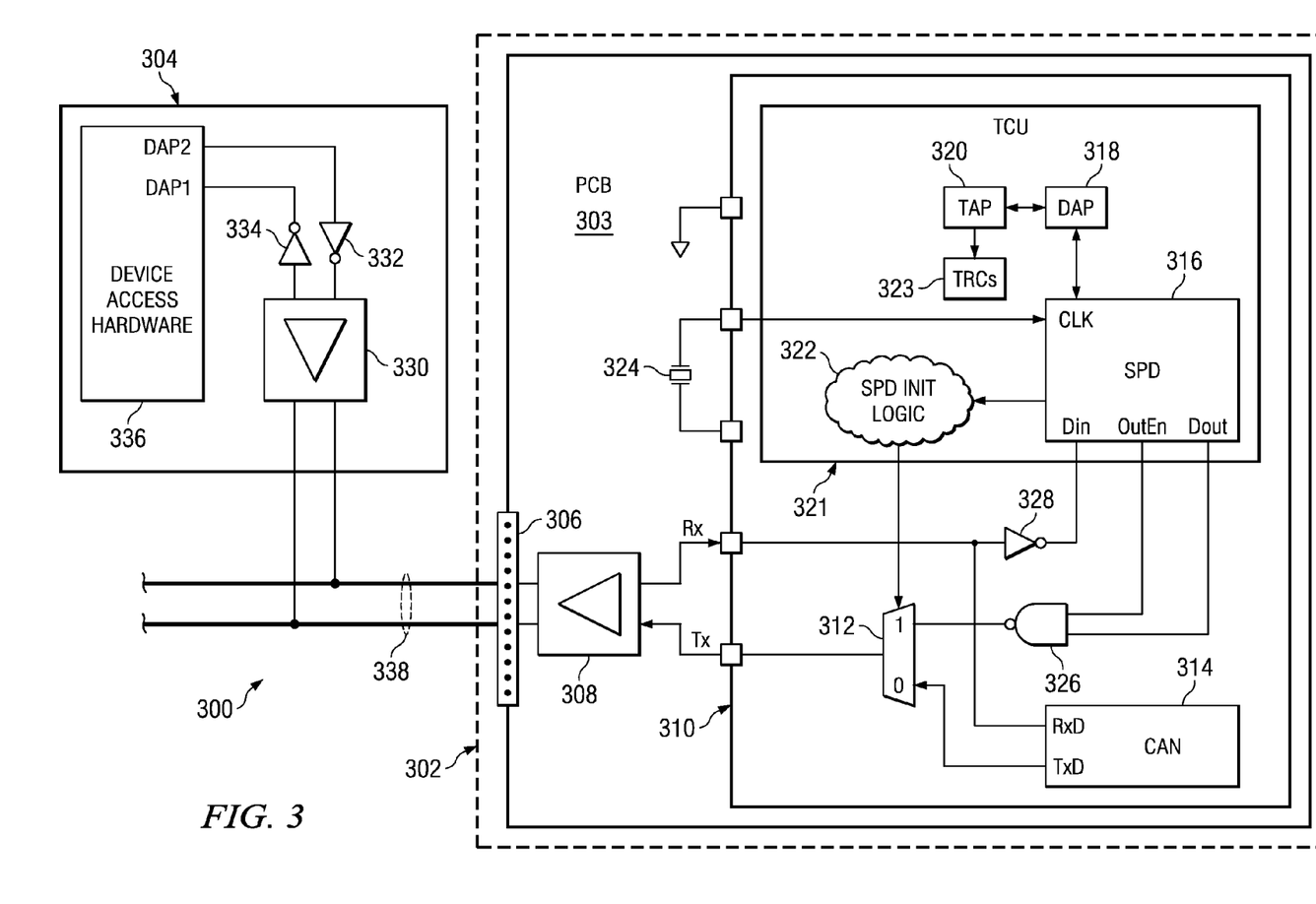
FIG. 3 illustrates an embodiment test electronic control unit test architecture.

FIG. 3 illustrates ECU system under test 300 according to an embodiment of the present invention. In ECU system under test 300, ECU 302 is coupled to device tester 304 via CAN interface bus 338. ECU 302 has PCB 303 on which microcontroller 310, and bus interface circuit 308 is mounted in embodiments of the present invention.

If an automotive ECU unit fails in the field, it is important for the manufacturer of the failed ECU unit and/or the manufacturer of the on-board components to analyze the failed ECU and diagnose the cause of the failure. Diagnosing ECU units according to the conventional art often requires an intrusive analysis of the module, which typically involve disassembly of the module. In the case of component failure, conventional art diagnosis techniques may require circuit board modifications and/or alterations in order to get to the root of the problem. Disadvantages of such intrusive diagnosis techniques include the time and expense of diagnosing the ECU. Furthermore, an intrusive diagnosis can physically alter the failed ECU and possibly mask or alter the mode of failure.

In embodiments of the present invention, ECU diagnosis is performed though the ECU interface or connector without having to disassemble or open the ECU. Non-intrusive testing of ECU 302 is accommodated by providing a test interface within the ECU addressable over interface bus 338. In some embodiment microcontroller chips that access interface bus 338 using the CAN standard, the chip must be functional in order for the CAN interface to operate. Therefore, in embodiments where test functionality is required for non-operational or partially functioning components, other hardware besides the existing dedicated CAN interface is used. In ECU modules that use proprietary software, having a non-CAN test interface can enhance security by preventing unauthorized access test functions via user software. In alternative embodiments of the present invention, testing and diagnosis can also be performed using the CAN interface.

Microcontroller 310 has CAN interface circuit 314 used to communicate with microcontroller 310 during normal operation, and Single Pin DAP (SPD) interface 316 within test control unit (TCU) 321 used to communicate with test circuits during test operation. Both SPD interface 316 and CAN interface 314 is coupled to interface bus 338. Mux 312 selects either signal Dout from SPD interface 316 or TxD from CAN interface 314 to form output signal TX. Input signal Rx is coupled to Din of SPD interface 316 and CAN interface 314. CAN transceiver 308 buffers logic level signals Rx and Tx and drives interface bus 338 via connector 306.

In an embodiment of the present invention, CAN-interface 314 is represented by two uni-directional pins RxD and TxD. These pins are coupled to a CAN transceiver 308 on the PCB, which converts the dominant ('0') and recessive ('1') TxD-values to corresponding levels at interface bus 338, which is implemented using a 2-wire differential CAN-bus structure. In embodiments of the present invention, a signal is dominant if at least one CAN interface device on a CAN bus can drive a dominant value independent of how many CAN interfaces output a recessive value. For example, on a bus having a pull-down transistor and a pull-up resistive load to VDD or VDD, the pulldown value is a dominant level and the pullup value is the recessive level. CAN-transceiver 308 converts the voltage difference of the two CAN-bus wires to a corresponding logical level at RxD. CAN interface 314 preferably operates at a maximal operation speed of 1 Mbit/s in peer-to-peer environments and 512 kbit/s in regular environments. The CAN protocol consists of specific frames (data-, remote- and error-frames) with a maximal length of up to 128 bits, whereupon the last 7 bits are transmitted as recessive ('1') End-of-Frame bits. Afterwards at least three recessive bits follow before the next frame can start. In alternative embodiments of the present invention, other operation speeds and interface bus protocols can be used.

TCU 321 provides an interface to microcontroller 310 test functions such as boundary scan and other internal test modes. In embodiments of the present invention, TCU 321 has a test access port (TAP) 320, which functions as a JTAG-TAP to provide boundary scan capabilities according to the JTAG 1149.1 or IEEE 1149.1 standard. TAP 320 is coupled to test control registers 323 that allow selection of specific test operations in a test-mode. Communication to the test interface is made via debug access port (DAP) 318 and single pin DAP interface 316. SPD interface 316 has a data input Din, a data output Dout, and an output enable signal OutEn. An on-board crystal oscillator circuit (not shown), using crystal 324, clocks SPD interface 316 at a frequency of about 10 MHz. Alternatively, other oscillator frequencies can be used depending on the application and its specifications.

External debug hardware 304 is coupled to interface bus 338, and has device access hardware 336 having input signals DAP1 and output signal DAP2. Inverters 334 and 332 buffer these signals to and from CAN interface transceiver 330. During test operation, SDP init logic 322 allows SPD interface 316 to access bus interface 338 via CAN interface driver 308. A conventional DAP interface uses two pins: a clock pin and a bidirectional data pin. The CAN interface, on the other hand, uses two unidirectional pins: a transmit pin and a receive pin. DAP uses predefined telegrams with start-bit, command- and data-field to trigger test/debug-based read/write operation to serial shift-registers. In embodiments of the present invention, these DAP telegrams are simpler in comparison to the CAN-frames and are initiated from external debug hardware 304.

Figure 5:
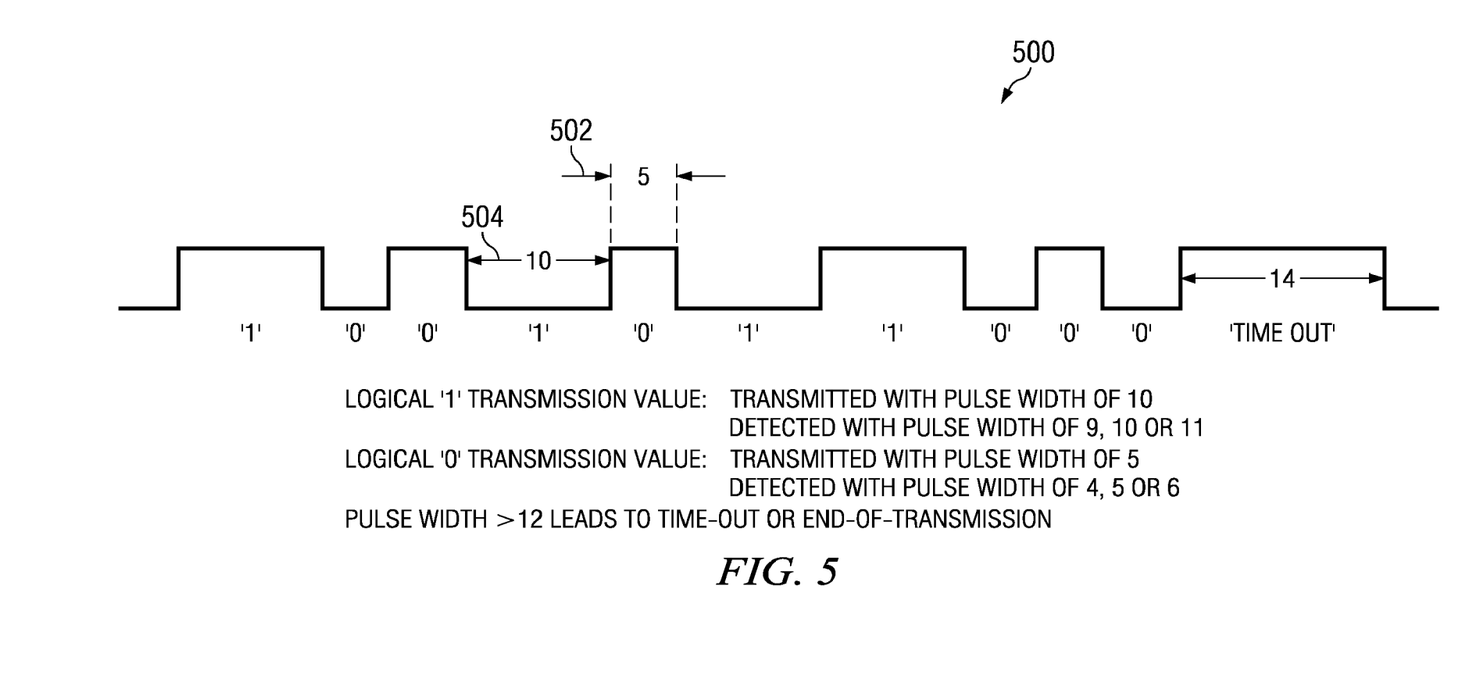
FIG. 5 illustrates a timing diagram of an embodiment control word.

SPD block 316 converts the two DAP pins to one bidirectional data signal with a pulse modulated waveform so that data is transmitted by using different pulse-widths. FIG. 5 illustrates an embodiment coding scheme 500 based on a single-wire DAP protocol. For example, a '0' value 502 is transmitted with a different pulsewidth from a '1' value 504. In an embodiment of the present invention, a '0' is transmitted using a pulsewidth of 5 unit time periods, while a '1 is transmitted using 10 unit time periods. A pulsewidth of greater than 12 time periods signifies a time out or an end of transmission. At the receive side, a logical '1' is detected if a pulse width of 7, 8, 9, 10 or 11 unit time periods is received, while a logical '0' is detected if a pulse width of 1, 2, 3, 4, 5 or 6 unit time intervals is received. The example illustrated in FIG. 5 shows an oversampling rate of 5 times the smallest transmitted and/or received time period. In other embodiments of the present invention, other oversampling rates and pulsewidths can be used to signify transmitted data. Because a single wire is used to transmit SPD data, SPD 316 has a clock source to oversample the input data. Internally SPD 316 counts the number of internal pulses between two adjacent signal edges.

Figure 4:
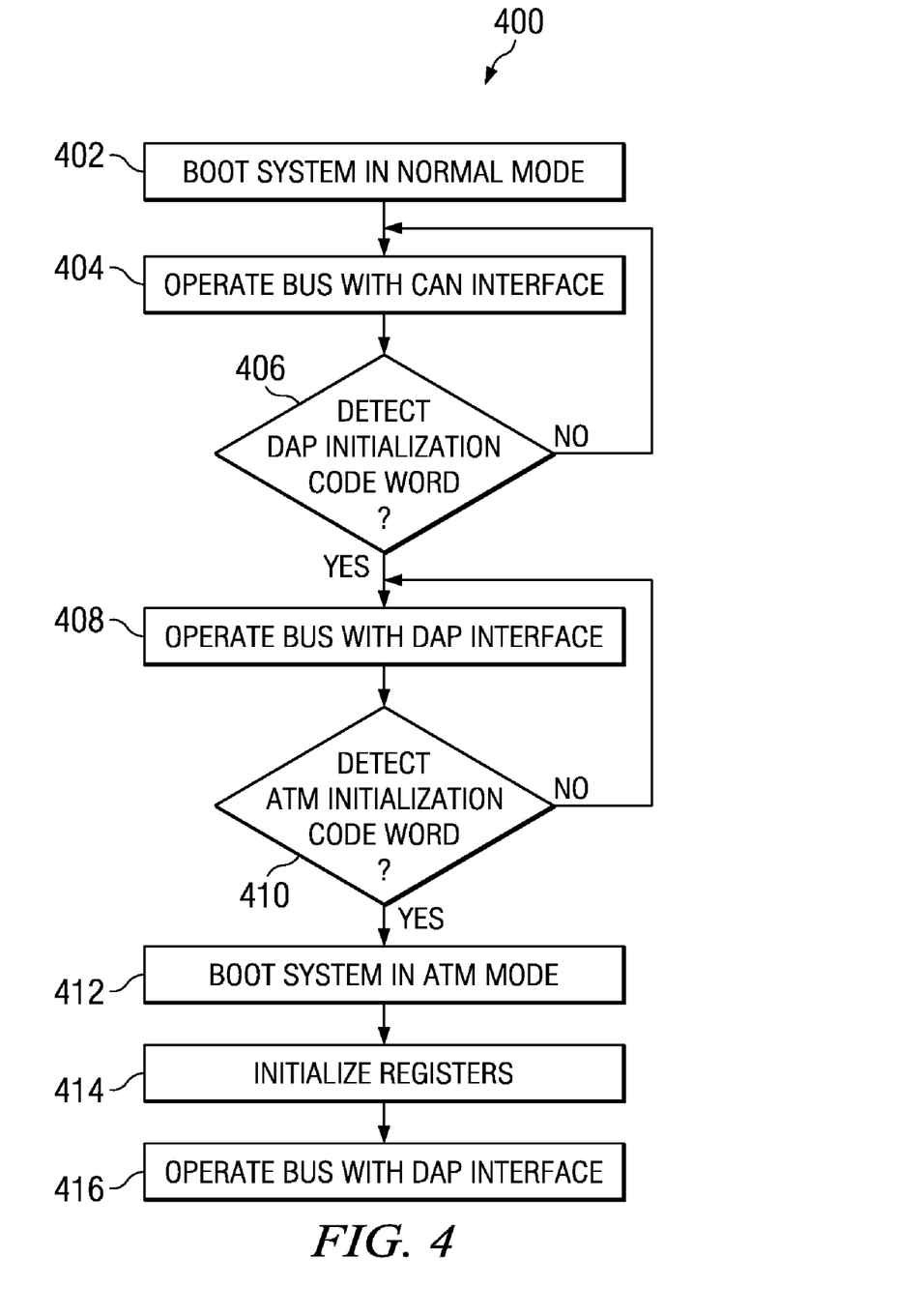
FIG. 4 illustrates a flow chart of an embodiment ECU interface method.

FIG. 4 is a flow chart 400 illustrating an embodiment process by which an embodiment ECU transitions from a normal mode into an application test mode. In step 402, the ECU system is booted in a normal operation mode, which is typically the default boot mode of the systems. The system normally functions in the normal operating mode to provide engine control, traction control, or other tasks according to the design of the ECU particular module. During normal mode, the ECU module is configured to operate using the CAN interface as shown in step 404. In alternative embodiments of the present invention, the ECU can be configured to use other interfaces besides a CAN interface, for example, LIN or FlexRay.

During the normal operation mode, the ECU is configured to detect a DAP initialization codeword on the CAN bus in step 406. This DAP initialization codeword is preferably configured to be outside of the set of recognizable CAN interface codewords, or, alternatively, outside the set of recognizable codewords of the particular interface protocol is used by the ECU in a normal mode of operation. In a preferred embodiment of the present invention, the DAP initialization codeword is defined as 1024 '0'-values submitted via the CAN interface in SPD format, which appears as an edge transition every 500 ns to 700 ns. The exact maximal duration between two adjacent edges, which are still recognized as a '0'-value by SPD, depends on the oversampling rate and the SPD-internal operating frequency. This particular initialization codeword is not recognized by the CAN interface because the CAN transaction protocol defines a normal CAN exchange to occur at between about 512 kbit/s and about 1 Mbit/s, so that an expected edge transition for a CAN transmission typically does not produce an edge transition faster than every 1 µs to 2 µs. Accordingly, during normal CAN operation, embodiment SPD interface 316 (FIG. 3) will not recognize the DAP initialization codeword because the longer CAN edge transition time is interpreted by SPD interface 316 as '1'-values, or time out values. In alternative embodiments of the present invention, other DAP initialization codewords can be used.

Because the transmission of the DAP initialization codeword violates the CAN protocol, an active CAN node (i.e. CAN interface 314 in FIG. 3) will react to the DAP initialization codeword by sending an error-frame until an overflow occurs in an internal error counter, thereby automatically disabling the CAN node. In some embodiments of the present invention, the presence of these error frames may disturb the SPD initialization sequence and effectively require a codeword that contains more than the 1024 '0' values for the initialization codeword to be recognized.

After a successful transmission and reception of the DAP initialization codeword, control of the CAN transmit pin (TX in FIG. 3) is transferred from CAN interface 314 (FIG. 3) to SPD interface 316 (FIG. 3), so that external bus 338 operates with the SPD (or DAP) interface as shown in step 408. Once the interface is switched, external bus 338 (FIG. 3) has direct access of SPD interface 316, DAP interface 318 and JTAG-TAP 320, and the available tool access functionality is that which would be normally available in a normal operation mode. In alternative embodiments, dedicated DAP and JTAG pins on device 310 (FIG. 3) are disabled.

When the SPD connection is established for tool access, software debug operations such as reading or writing memory or controlling the processor core (start, stop, step, breakpoints, etc.) are possible. With tool access functionality, analysis is possible for the case where a failure is due to analog interface 200, but not due to microcontroller 202.

In order to activate application test mode (ATM), an ATM initialization code word is detected in step 410. ATM mode provides a similar test functionality as the normal microcontroller test functionality described hereinabove. In a preferred embodiment, a unique 16-bit codeword is written to the SPD interface. Once the ATM initialization code word is detected, the ECU system is rebooted in the ATM mode in step 412. In a preferred embodiment, all the registers in the microcontroller, with a few exceptions, are reset during reboot in order to enhance security (i.e. prevent proprietary software from being read back during test mode) in state 414. In alterative embodiments, some or all registers can retain their previous state. In preferred embodiments, however, rebooting the system in state 412 affects all microcontroller components but does not affect JTAG domain components. Once the system has been booted in test mode, the same test functionality that would be available to IC 310 in a conventional test mode is accessible via the interface bus 338 while in ATM mode. In some embodiments of the present invention, more or less test functionality can be accessible via interface bus 338, for example, a conventional scan mode or other modes may not be available in ATM mode. In embodiments of the present invention, general purpose I/O pins (GPIOs) are constrained to a default state via manual selection in ATM mode, for example, by having inputs with a weak pull enabled to a known state. Furthermore, analog functions are typically disabled while in ATM mode. In alternative embodiments of the present invention, a different mix of functions may be enabled or disabled in ATM mode according to the application and its specifications.

Figure 6:
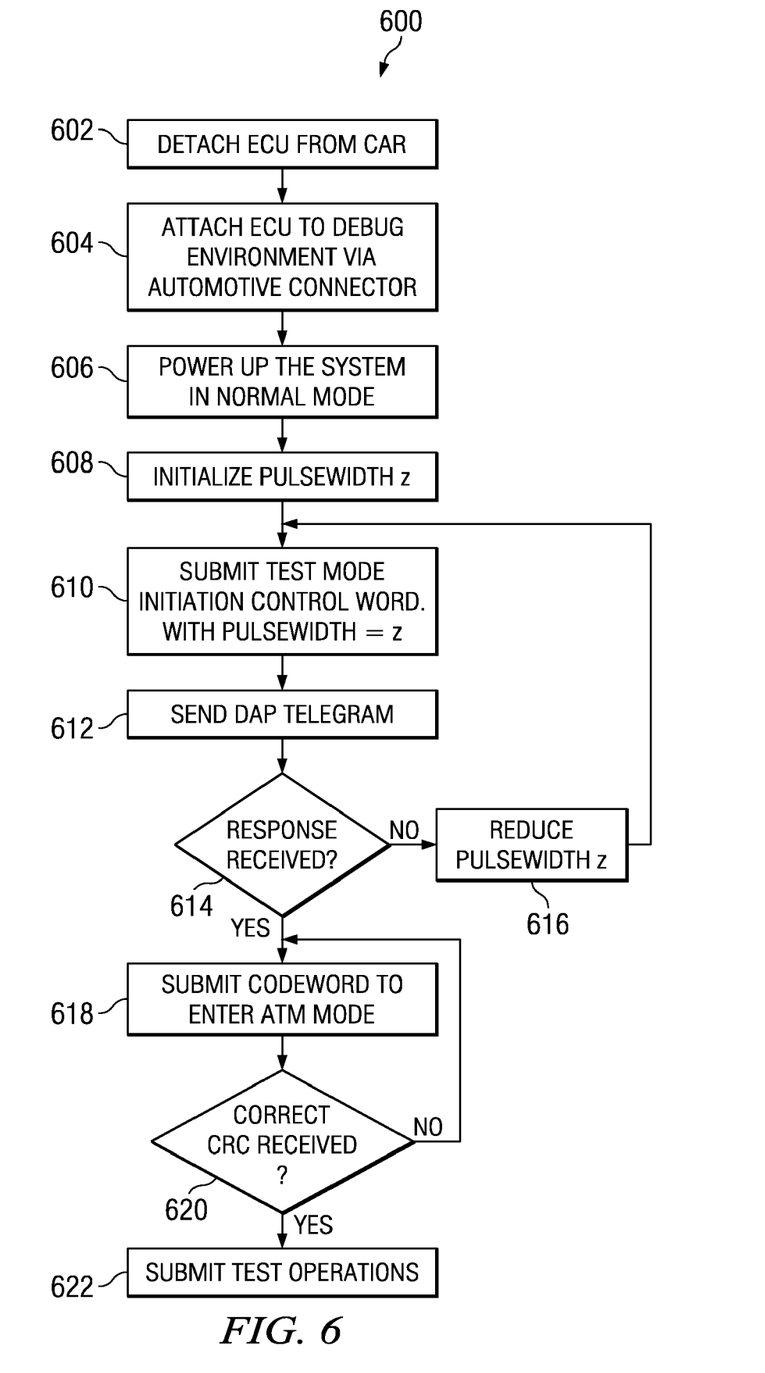
FIG. 6 illustrates a flow chart of an embodiment ECU testing method.

Turning to FIG. 6, a flow chart showing a process of testing an embodiment ECU according to an embodiment method is illustrated. In an embodiment, the ECU is detached from a car (or other device) in step 602. Such detachment typically involves the physical removal of the ECU from the rest of the automotive system, however, in alternative embodiments, detachment may not be necessary if the CAN bus is accessible to a test fixture. In step 604, the ECU is attached to a debug environment such as test device 304 shown in FIG. 3, and in step 606, the system is powered up in normal mode.

In step 608, a pulsewidth for transmission on the CAN is initialized with a pulsewidth=z, and in step 610, a test mode initialization control word is submitted on the CAN bus with the pulsewidth=z. In an embodiment, the z is initialized to be between about 500 ns and about 700 ns, depending on the frequency of clock source 324 for SPD 316 (FIG. 3). A series of at least 1024 edges are then sent from the test device to the ECU. In step 612, a DAP telegram is sent in DAP format on the CAN bus and the CAN bus is polled for a response in step 614. If a response is not received within up to about 100 μs, the pulsewidth value z is reduced by 10%, and another test mode initiation control word is submitted by repeating steps 610, 612 and 614. In alternative embodiments, other time limitations can be implemented. Once step 614 perceives that a response has been received, a codeword is submitted to enter ATM mode in step 618. The tester then waits to see if a correct cyclic redundancy check (CRC) is received in step 620. The CRC is preferably checked automatically by device access hardware 336 (FIG. 3). If the correct CRC is received, test operations are submitted by the tester in step 622, otherwise, the codeword to enter ATM mode is resubmitted in step 618.

In an embodiment, a method of testing a module having a bus interface includes setting a module operating mode to a first mode, wherein setting includes configuring the bus interface to operate using a first bus interface protocol. After setting the module to the first operating mode, the operating mode is changed from the first operating mode to a second operating mode. This change of operation mode is effected by writing a first codeword to the bus interface, and configuring the bus interface to operate using a second bus interface protocol. In an embodiment, the first codeword different from a codeword used within the first bus interface protocol. Furthermore, in some embodiments, the first codeword is not defined in the first bus interface protocol. After changing the operating mode to the second operating mode, the second bus interface protocol is used for tool access of on-chip software debug and hardware test infrastructure. In one embodiment, the first operating mode includes a normal operating mode, and the second operating mode includes a tool access operating mode.

In an embodiment, the method also includes activating an application test after changing the operating mode from the first operating mode to the second operating mode. The application test mode, which is activated by issuing an application test mode command on the bus interface, is configured to reboot the module in the application test mode, where rebooting includes, for example, initializing registers within the module. In some embodiment, setting the module operating mode further booting the module in the first operating mode. After activating the application test mode, module is operated in the application test mode, which can include accessing a HAG interface within the module.

In an embodiment, the first bus interface protocol and/or the second bus interface protocol can be a Controller Area Network (CAN) interface protocol. Alternatively, the second bus interface protocol can be a Debug Access Port (DAP) protocol. In one example embodiment, the first bus interface protocol is a Controller Area Network (CAN) interface protocol, the second bus interface protocol is a Debug Access Port (DAP) protocol, the first codeword comprises 1024 "0" values in a Single Pin DAP (SPD) format.

In an embodiment, the first bus protocol includes a maximum frequency or edge transition rate, and writing the first codeword to the bus interface comprises operating the bus interface at a frequency or edge transition rate exceeding the maximum frequency or edge transition rate of the first bus protocol.

In an embodiment, a system includes a bus interface port, a selection circuit coupled to the bus interface port, a first bus interface circuit coupled to the selection circuit, and a second bus interface circuit coupled to the selection circuit. The selection circuit is configured to select between the first bus interface circuit and the second bus interface circuit. The system further includes an initialization circuit configured to detect a first codeword written to the bus interface port, and to activate the second bus interface circuit if the first codeword is detected. In an embodiment, the system also includes a controller circuit, and a test circuit coupled to the controller circuit and to the second bus interface circuit, where the test circuit controllable via the second bus interface circuit. In some embodiments, the test circuit is configured to interface to a JTAG interface and/or the bus interface port includes an exclusive interface to access the test circuit. The system may further include a transceiver coupled to the bus interface port. Some embodiment systems may be implemented on an integrated circuit and/or incorporated within an automotive controller.

In an embodiment, the system also includes an application test mode initialization circuit coupled to the second bus interface circuit. The application test mode initialization circuit is configured to reboot the controller circuit and place the test circuit under the control of the second bus interface circuit after the controller circuit is rebooted.

In an embodiment, the first bus interface circuit includes a CAN interface circuit, and the second bus interface circuit comprises a DAP interface circuit. The DAP interface circuit can be coupled to the test circuit. In some embodiments, the first codeword is undefined within the CAN protocol. The first codeword can have edge transitions at an edge transition rate or frequency exceeding a maximum edge transition rate or frequency of the CAN protocol.

In an embodiment, an automotive controller module includes a printed circuit PCB, a target circuit disposed on the PCB, a test circuit coupled to the target circuit, where the test circuit is configured to test the target circuit. The module also includes a first interface circuit coupled to the target circuit, and a second interface circuit coupled to the test circuit. The first interface circuit is configured to communicate with the target circuit in a normal mode according to a first protocol, and the second interface circuit configured to communicate with the test circuit according to a second protocol.

In an embodiment the system also includes an interface selection circuit configured to select between the first interface circuit and the second interface circuit, a bus port coupled to the interface selection circuit, and a test mode initialization circuit. The test mode initialization circuit is configured to detect a first codeword on the bus port, activate the second interface circuit upon detection of the first codeword on the bus port, and reboot the target circuit and the test interface into a test mode upon receipt of a second codeword after the second interface has been activated. In an embodiment, the first codeword different from a codeword defined by the first protocol. Furthermore, the first interface may include a Controller Area Network (CAN) interface, and the target circuit may include a microcontroller.

It will also be readily understood by those skilled in the art that materials and methods may be varied while remaining within the scope of the present invention. It is also appreciated that the present invention provides many applicable inventive concepts other than the specific contexts used to illustrate embodiments. Accordingly, the appended claims are intended to include within their scope such processes, machines, manufacture, compositions of matter, means, methods, or steps.

What is claimed is:

1. A method of testing a module comprising a bus interface, the method comprising:
    setting a module operating mode to a first mode, setting comprising configuring the bus interface to operate using a first bus interface protocol; wherein the first interface bus protocol comprises a maximum edge transition rate;
    after setting the module to the first operating mode, changing the operating mode from the first operating mode to a second operating mode, changing the operating mode from the first operating mode to the second operating mode comprising
        writing a first codeword to the bus interface, the first codeword different from a codeword used within the first bus interface protocol, wherein writing the first codeword to the bus interface comprises operating the bus interface at an edge transition rate exceeding the maximum edge transition rate of the first bus protocol, and
        configuring the bus interface to operate using a second bus interface protocol; and
    after changing the operating mode to the second operating mode, using the second bus interface protocol for performing tool access of software debug and hardware test infrastructure using the second bus protocol, the software debug and hardware test infrastructure being accessible during the second operating mode.

2. The method of claim 1, wherein the first codeword is not defined in the first bus interface protocol.

3. The method of claim 1, wherein setting the module operating mode further comprises booting the module in the first operating mode.

4. The method of claim 1, wherein:
    the first bus interface protocol comprises a Controller Area Network (CAN) interface protocol;
    the second bus interface protocol comprises a Debug Access Port (DAP) protocol; and
    the first codeword comprises 1024 "0" values in a Single Pin DAP (SPD) format.

5. The method of claim 1, wherein:
    the first operating mode comprises a normal operating mode; and
    the second operating mode comprises a tool access operating mode.

6. The method of claim 1, wherein the maximum edge transition rate is an edge transition every 1 µs.

7. The method of claim 1, wherein the first bus interface protocol comprises a Controller Area Network (CAN) interface protocol.

8. The method of claim 7, wherein the second bus interface protocol comprises a Controller Area Network (CAN) interface protocol.

9. The method of claim 7, wherein the second bus interface protocol comprises a Debug Access Port (DAP) protocol.

10. The method of claim 1, further comprising after changing the operating mode from the first operating mode to the second operating mode, activating an application test mode, activating the application test mode comprising issuing an application test mode command on the bus interface, wherein the application test mode command is configured to reboot the module in the application test mode, rebooting comprising initializing registers within the module.

11. The method of claim 10, further comprising:
    after activating the application test mode, operating the module in the application test mode, wherein operating the module in the application test mode comprising accessing a JTAG interface within the module.

12. A system comprising:
    a bus interface port;
    a selection circuit coupled to the bus interface port;
    a first bus interface circuit coupled to the selection circuit, the first bus interface circuit configured to operate according to a first bus protocol;
    a second bus interface circuit coupled to the selection circuit, wherein the selection circuit is configured to select between the first bus interface circuit and the second bus interface circuit;
    an initialization circuit configured to
        detect a first codeword written to the bus interface port, wherein the first codeword comprises edge transitions at an edge transition rate exceeding a maximum edge transition rate of the first bus protocol, and
        activate the second bus interface circuit if the first codeword is detected;
    a controller circuit; and
    a test circuit coupled to the controller circuit and to the second bus interface circuit, the test circuit controllable through the bus interface port via the second bus interface circuit.

13. The system of claim 12, further comprising an application test mode initialization circuit coupled to the second bus interface circuit, the application test mode initialization circuit configured to reboot the controller circuit and place the test circuit under the control of the second bus interface circuit after the controller circuit is rebooted.

14. The system of claim 12, further comprising a transceiver coupled to the bus interface Port.

15. The system of claim 12, wherein:
    the first bus interface circuit comprises a Controller Area Network (CAN) interface circuit;
    the first bus protocol comprises a CAN protocol; and
    the second bus interface circuit comprises a Debug Access Port (DAP) interface circuit.

16. An integrated circuit comprising the system of claim 12.

17. An automotive controller comprising the system of claim 12, wherein the bus interface port comprises an exclusive interface to access the test circuit.

18. The system of claim 15, wherein the DAP interface circuit is coupled to the test circuit.

19. The system of claim 15, wherein the first codeword is undefined within the CAN protocol.

20. An automotive controller module comprising:
   a printed circuit board (PCB);
   a target circuit disposed on the PCB;
   a test circuit coupled to the target circuit, the test circuit configured to test the target circuit;
   a first interface circuit coupled to the target circuit, the first interface circuit configured to communicate with the target circuit in a normal mode according to a first protocol;
   a second interface circuit coupled to the test circuit, the second interface circuit configured to communicate with the test circuit according to a second protocol;
   an interface selection circuit, the interface selection circuit configured to select between the first interface circuit and the second interface circuit;
   a bus port coupled to the interface selection circuit, wherein the test circuit is controllable through the bus port via the second interface circuit; and
   a test mode initialization circuit configured to
      detect a first codeword on the bus port, the first codeword different from a codeword defined by the first protocol,
      activate the second interface circuit upon detection of the first codeword on the bus port, and
      reboot the target circuit and the test circuit into a test mode upon receipt of a second codeword after the second interface has been activated, wherein the first codeword comprises edge transitions at an edge transition rate exceeding a maximum edge transition rate of the first protocol.

21. The automotive controller of claim 20, wherein:
   the first interface comprises a Controller Area Network (CAN) interface; and
   the target circuit comprises a microcontroller.

22. The automotive controller of claim 20, wherein the test circuit is configured to interface to a JTAG interface.

* * * * *